Dec. 19, 1950  W. H. SMYERS  2,534,883
MODIFIED RUBBER PRODUCTS
Filed Nov. 16, 1946

William H. Smyers INVENTOR

Patented Dec. 19, 1950

2,534,883

UNITED STATES PATENT OFFICE 2,534,883

MODIFIED RUBBER PRODUCTS

William H. Smyers, Westfield, N. J., assignor, by mesne assignments, to Jasco, Incorporated, a corporation of Delaware Application November 16, 1946, Serial No. 710,330

2 Claims. (Cl. 260—4)

This invention relates to modified rubber products and methods of preparing and using the same.

This application is a continuation-in-part of applications Serial No. 670,730 filed May 12, 1933, now Patent No. 2,226,589, Serial No. 704,747 filed December 30, 1933, now Patent No. 2,280,860, Serial No. 170,048 filed October 20, 1937, now Patent No. 2,226,590 and Serial No. 372,603 filed December 31, 1940, now abandoned.

In said prior applications there are disclosed several methods of making and using modified rubber products by dissolving in a volatile solvent, a modifying agent, such as paraffin wax, high molecular weight isobutylene polymers, etc., and then swelling rubber or synthetic rubber or other rubber-like materials in the resultant solution and using the final product for various purposes, such as, for making laminated metal foil products as disclosed specifically in application Serial No. 670,730, for waterproofing the surface of fibrous sheets of cloth or paper as specifically disclosed in Serial No. 704,747, and for making insulated electric conductors as specifically disclosed in application Serial No. 170,048.

Broadly the present invention comprises using similar types of modified rubber compositions for preparing sheets or films which are thick enough and strong enough to remain in the form of a continuous coherent sheet without being affixed to any other material as a base, and also comprises the use of said modified rubber compositions, either in the form of such sheets or otherwise, for preparing laminated fibrous material, such as two sheets of cloth or paper bonded together with said modified rubber.

The modified rubber composition may be prepared by swelling a colloidal material such as rubber with a solution of a substantially non-volatile organic constituent such as paraffin wax or other high molecular weight hydrocarbons dissolved in a suitable volatile solvent such as gasoline. When the volatile solvent is evaporated from such a product, the resulting composition is found to be a homogeneous mixture of high molecular weight hydrocarbons or other similar material intimately and uniformly dispersed within the particles or cells of the colloid. The homogeneity of this composition is a distinct advantage over the heterogeneous character of compositions prepared by mere mechanical mixing of a heavy hydrocarbon such as paraffin wax with a colloid such as rubber or by separately dissolving each of these materials in a volatile solvent and mixing the two solutions, both of which methods have been commonly used in the past. One disadvantage of these prior compositions is that upon evaporation of the volatile solvent the paraffin crystallizes into relatively large crystals and tends to migrate to the surface of the composition and separates from the rubber particles thus leaving the latter unprotected from oxidation by air.

Another method which has been used heretofore is to dissolve rubber in molten wax with suitable heating and stirring or milling but this procedure is not satisfactory for some purposes because the heating and milling effect a substantial breakdown of the colloidal structure of the rubber and therefore reduces its strength, and besides, the molten wax does not penetrate intracellularly into the rubber at all satisfactorily either from the point of view of uniformity or speed.

The present invention overcomes those and other disadvantages of the prior art by providing a composition in which the colloid and the high molecular weight hydrocarbon or other non-volatile organic material appear to mutually protect each other. It is believed that the original strength of the colloidal rubber structure is retained, that the cell walls of the rubber particles, owing to the particular method of preparation, intimately surround the minute particles of paraffin and thereby prevent migration of the paraffin to the surface of the coating. It is also believed that the paraffin or other modifying agent is uniformly, intimately and intracellularly dispersed within the rubber colloid particles and serves to protect the latter from oxidation and other deteriorating effects of the weather, acids, alkalies or other chemicals, etc. Other features of the invention will be described later.

For the sake of illustration, one method of carrying out the invention is described in detail as follows:

Paraffin wax of about 122° F. melting point was dissolved in gasoline at room temperature until the gasoline was practically saturated with paraffin (about 12–13 parts by weight paraffin per 100 parts by weight of gasoline) and then sufficient crude pale crepe rubber, about 10 parts by weight (in the form of small pieces or thin sheets) is added to absorb practically all of the paraffin-gasoline solution. During this absorption the rubber swells; the swelling is allowed to proceed without agitation and when practically completed, any residual paraffin solution is removed by decantation, filtration and/or washing with fresh gasoline. Then the swollen jelly-like rubber aggregates are mechanically comminuted in any suitable manner (as by forcing through a 1/16" wire mesh, etc.) just sufficiently to make a fairly uniform and spreadable composition but not so much as to break down the colloidal structure of the rubber.

This composition can be used according to the present invention as will be more fully described later.

The paraffin wax to be used may have any desired melting point, e. g. 122° F., 115° F., 130° F., 140° F., or even higher. In place of paraffin wax other modifying agents can be used, such as various hydrocarbon materials, e. g., viscous lubricating oil, petrolatum, asphalts, soluble polymers of olefins, diolefins, etc., or any mixtures of these various hydrocarbons with or without paraffin wax. Also, fatty oils, e. g. cottonseed oil, etc., in small amounts, natural waxes, e. g. carnauba, ceresin or other vegetable waxes, or gums, or resins, such as amber, Canada balsam, colophony, copaiba, copal, dammar, myrrh, or shellac, synthetic petroleum hydrocarbon resins, e. g., those derived from cracking coil tar, etc., and soluble fractions of resins of the alkyd type, e. g., glycerolphthalic acid condensation products, or of the phenolformaldehyde type, polystyrene, polyindene, polycoumarone, etc., as well as other high molecular weight substantially non-volatile organic materials, e. g., alcohols, ketones, esters, ethers, etc. The type and proportions of these various modifying agents can be adjusted in order to obtain the desired combination of physical properties of hardness, firmness, softening temperatures, cold flow tendencies, etc.

A hydrocarbon polymer offering particularly interesting possibilities as a modifying agent according to the present invention may be prepared by polymerizing olefins, particularly iso-olefins and especially iso-olefins having the general formula $R(R')C:CH_2$ in which R and R' represent the same or different alkyl groups having from 1 to about 4 carbon atoms, such as isobutylene, 2-methyl butene-1, etc., at temperatures below —10° C., e. g. —20° C., —50° C., or even —100° C., in the presence of an active inorganic halide of the Friedel-Crafts type, preferably $BF_3$ or $AlCl_3$, which process is now well known in the art.

The polymer produced by this polymerization process has a molecular weight which may be regulated by the process of manufacture, for example, ranging from about 2,000 or 3,000 up to 10,000 or 15,000 for a plastic and somewhat sticky polymer, or ranging from about 50,000 to 300,000 or more for an elastic, non-tacky polymer substantially free from tendency toward cold flowing at ordinary room temperature.

The resulting polymer is a plastic or elastic solid which is substantially saturated in respect to hydrogen, having an iodine number at least below 5 and generally below 1, and colorless, if care be taken to avoid the presence of colored bodies. These polymers are greatly resistant to oxidation and attack by ozone or various other chemicals such as sulfuric acid, nitric acid, etc., or alkalies such as caustic soda and the like and are also resistant to penetration by water, moisture, etc. These polymers are extremely durable in that they are non-volatile and non-hardening as well as highly resistant to weathering. They are soluble in the normally liquid petroleum hydrocarbons such as naphtha, mineral lubricating oils, as well as at least partially soluble in liquefied normally solid petroleum hydrocarbons such as paraffin wax, petrolatum, and asphalt, and when dissolved in any of these materials have the property of increasing the viscosity thereof and decreasing the temperature coefficient of viscosity thereof which means reducing the amount of change in viscosity with any given change in temperature.

If desired, the polymerized product may be separated into fractions having different molecular weights either by extraction or selective precipitation, using solvents such as methane, propane, naphtha, benzol, acetone benzol, etc., at the proper temperature to make the desired separation. In this way the polymers having any desired average molecular weight, such as about 100,000, may be separated from those having a substantially lower or higher molecular weight.

A somewhat similar aliphatic hydrocarbon product may be secured by hydrogenation, limited destructive hydrogenation, etc., of suitably high molecular weight unsaturated polymers such as rubber, synthetic rubbers, e. g., polymerized butadiene or copolymers. The polyisobutylene mentioned above is, however, definitely superior to such a hydro-rubber and is to be preferred thereto.

Instead of rubber, any other rubbery, i. e. flexible rubber-like, colloidal material swellable by non-aqueous volatile solvents may be used such as certain rubber substitutes, cellulose derivatives, and other natural or synthetic colloidal resins or gums which swell when subjected to the action of naphtha or other suitable volatile solvents. The rubber or other colloidal material should be one having a continuous, meshed or aggregate structure and not composed of many small separate particles; for instance, unmasticated rubber is better than masticated rubber, in which the particles or cells have been mashed and torn apart by heavy mechanical rolling on a rubber mill.

The rubber to be used may be crude rubber such as pale crepe, smoked sheet (ribbed or unribbed), masticated or milled rubber, etc. which may be derived from any suitable source such as India, Para, etc. Also, some of the natural rubber-like materials or rubber substitutes may be used such as balata, gutta percha, etc., although it is frequently best to use a mixture, regulating the proportions so as to best take advantage of the more elastic properties of the rubber and the harder properties of gutta percha, and the like. Likewise, instead of natural rubber, one may use synthetic rubber substitutes such as polymerized diolefins, e. g., butadiene, isoprene, chloroprene, etc., which have been polymerized to rubber-like consistency. In some cases, it is also advisable to use mixtures of the natural rubber or rubber-like materials with the synthetic rubber, for instance, to take advantage of the high resistance to abrasion which characterizes the polymerized butadiene rubber made under certain known conditions.

The naphtha or other volatile liquid to be used for dissolving the paraffin or other modifying agents and for swelling the rubber or similar colloidal material, can be referred to as a solvent-swelling agent and may be composed of various types of chemical compounds depending upon the nature of the modifying agent and the colloidal material to be swelled. One essential feature is that the solvent-swelling agent should actually dissolve the non-volatile modifying agent which is to be incorporated within the colloidal material but that it should dissolve little, if any, of the colloidal material itself. In other words, it is desired that a substantial proportion of the original colloidal cellular structure of the rubber be maintained. Instead of using naphtha or gasoline, other hydrocarbon liquids may be used, such as benzol, toluol or aromatic or mixed aromatic aliphatic hydrocarbons, or other compounds, such as esters, e. g. isopropyl acetate, amyl acetate, etc., ethers, e. g. isopropyl ether, ketones, e. g. methyl ethyl ketone, etc.

Non-volatile ingredients other than the modifying agent such as perfume, color, e. g. dyes, pigments and the like, finely divided solids or fillers or reinforcers, such as carbon black, zinc oxide, etc., may be incorporated into the modified rubber composition. If desired, chlorinated, fluorinated or other halogenated compounds, e. g., chlorinated paraffin wax, chlorinated kerosene, chlorinated naphthalene, chlorinated rubber, etc., may be added to make the composition fireproof or fire resistant; still other ingredients may be added such as amino or hydroxy organic compounds (preferably aromatic, e. g. alpha naphthol, benzyl para amino phenol, etc.) may be added as anti oxidants and substances such as either colored materials or dye stuffs, e. g. azobenzene and the like or colorless compounds, aesculine, quinine and derivatives thereof may be incorporated to absorb rays of light which tend to destroy the rubber and which may tend to depolymerize saturated polymers such as high molecular weight poly isobutylene. These various addition agents may be dissolved along with the paraffin wax or other modifying agent in the solvent-swelling agent (if soluble therein), or mechanically suspended therein before or after the swelling of the colloidal material.

The proportions in which the colloidal material, the modifying agent, the solvent-swelling agent and any other addition agents are to be used may vary over a fairly broad range depending upon the particular manner in which the final composition is to be used and pending upon the type of raw materials used and the method of compounding. Usually the modified rubber composition should contain, on a dry or solvent-free basis, about 5 to 70%, preferably about 10 to 50% of rubber or other colloidal material and about 95 to 30% or preferably 90 to 50% of modifying agent. The amount of other miscellaneous addition agents such as carbon black, anti-oxidant, etc., may vary over wide limits, as for instance, from .01% to 1% or so in the case of anti-oxidants and up to 25% or even more in the case of finely divided solid fillers, based on the total weight of rubber and modifying agent. It is obvious that the various types of modifying agents serve as hardeners, plasticizers, etc. according to their physical properties and most of them also serve as protective agents from either mechanical or physical point of view or both. Accordingly, the exact type or types of modifying agent and proportions thereof to be used can be selected, as will be apparent to those skilled in the art, in order to obtain the best combination of physical and chemical properties according to the type of product being made and the circumstances under which it is to be used.

Although the products made according to this invention are highly useful without having the rubber or synthetic rubber, etc. vulcanized, under some circumstances it may be desirable to carry out a vulcanization step. This may be done, for example, by exposing the residual solvent-free modified rubber composition to the vapors of a vulcanizing agent such as sulfur monochloride or dichloride, or by immersing the modified rubber composition in such compounds in a liquid state, e. g. in the liquids themselves or in solutions thereof in suitable solvents such as naphtha, carbon disulfide and the like. Also, if desired, a substantial amount of sulfur may be mixed with the modified rubber composition while the solvent is still present therewith. Suitable vulcanization accelerators which are well-known in the art may also be incorporated into the modified rubber composition before evaporation of the solvent, either when using sulfur as the vulcanizing agent or when the sheet of modified rubber is to be cured by exposure to sulfur monochloride in the vapor or liquid state. Another method is to dissolve sulfur or an organic polysulfide, preferably with a small amount of vulcanization accelerator such as mercaptobenzothiazole, benzothiazyl disulfide, etc., in naphtha, benzene, carbon disulfide, or other volatile sulfur solvent or a mixture thereof, and then add the non-volatile modifying agent, and then swell the rubber in the resulting mixture, spread in a thin layer to evaporate the solvent, and heat the dry film to vulcanize it.

In carrying out the preparation of the modified rubber composition, the modifying agent is preferably dissolved in the solvent-swelling agent at room temperature or at slightly elevated temperature. For instance, since paraffin wax dissolves in naphtha at room temperature only to the extent of about 10 to 15 grams per 100 cc. (depending upon the melting point of the paraffin wax and upon the boiling range of the naphtha used) the temperature may be increased substantially, e. g. to 50° C. or even up to 80° C. or 100° C., if necessary carrying out the operations under reflux or under sufficient pressure to prevent evaporation of the solvent, in order to increase the solubility of the paraffin wax to the desired amount and in order to accelerate the solution thereof in the naphtha.

Also a slight warming may be used to accelerate the swelling of the rubber-like material in the volatile solvent solution of the modifying agent, as, for instance, to accelerate the swelling of rubber in a paraffin-gasoline solution, although excessive heating will destroy the colloidal cellular structure of the rubber. The amount of heating which can be done without harmful effect depends on both time and temperature and is also dependent upon the amount of solvents used in proportion to the modifying agent and the rubber-like material. Usually the time of swelling should be not more than about 36 hours (1½ days) at room temperature and not more than about 5 hours at 212° F. and preferably the swelling time should be within the approximate limits of 10 to 20 hours at room temperature (about 68 to 75° F.), about 2 to 4 hours at 130° F. or about 1½ to 3 hours at 212° F., the corresponding time required for intermediate temperatures being readily determined by interpolation from these figures. It is preferable to use a swelling time of $K \times (T-60)$ hours where K is a constant from 150 to 1500 and T is the temperature in °F.

The amount of volatile solvent to be used should be at least enough to cause substantially complete and uniform swelling of the rubber-like material within the time range just indicated above at the temperatures stated. Usually the amount of solvent should be about 15 to 25 times the volume of the rubber-like material to be swelled, or on a weight basis the solvent should be about 10 to 20 times the weight of the rubber or other rubber-like material to be swelled.

The exact amount of materials to be used in preparing the many varied compositions possible according to this invention cannot be stated definitely inasmuch as the proportions to be used will vary according to the materials used and to the particular use for which the composition is intended. On a dry basis, the amount of wax or equivalent material may be as low as 30% or even slightly lower and as high as 95% or so, but is preferably about 50 to 90%; while the amount of rubber may be as low as 5% and as high as 70% or higher, but is preferably about 10 to 50%. For use as a waterproofing composition, the following proportions by weight have been found especially suitable:

| | | |
|---|---|---|
| Gasoline | 80–85%, preferably about | 82% |
| Paraffin | 8–12%, preferably about | 10% |
| Rubber | 7–10%, preferably about | 8% |
| | | 100% |

Even very small amounts of modifying agent, e. g. 1%, 5%, 10% or more can be incorporated easily and with homogeneous distribution into the rubber or other rubber-like material without any milling. This is a great advantage over previously used compounding processes.

It should also be noted that the flexibility and hardness of the composition may be controlled within fairly wide limits by varying the type and proportion of non-volatile organic constituent to be dispersed within the rubber. The higher the molecular weight and possibly also the higher the viscosity of these non-volatile constituents, the less of them can be absorbed by the colloid at any certain concentration, and the more solvent must be used to serve as diluent.

If several modifying agents are to be used, as for example, a high molecular weight polyisobutylene and paraffin wax, they should both be dissolved in the naphtha (together with any other soluble addition agents to be used) before adding the rubber to be swelled. For example, up to 10 or 15% or more of a wax such as paraffin wax, or of a resin such as a normally brittle resin derived from cracking coal tar, may be dissolved in the naphtha along with from 1 to 10% or more of polymerized isobutylene, and 5 to 15% of rubber is then swelled in the solution (gasoline or naphtha representing the balance of the 100%).

If the modified rubber composition is to be vulcanized, sulfur, accelerator, anti-oxidants, etc. should be mixed into the composition before evaporation of the solvent. The following is an example of a composition obtained after evaporation of the solvent, when using a polyisobutylene as modifying agent:

| | Per cent by weight |
|---|---|
| Rubber | 60 |
| Polymerized isobutylene (80,000 mol. wt.) | 37 |
| Sulfur | 2 |
| Accelerator | 0.5 |
| Anti-oxidant | 0.5 |
| | 100.0 |

Since the proportions of materials to be used may vary over a fairly broad range depending upon the type of raw materials used and the purposes for which the product is to be used, the following outline is suggested for suitable limits (on a dry or solvent-free basis) for modified rubber compositions in which a saturated high molecular weight polymer, e. g. polyisobutylene is used to provide adhesiveness, inertness to chemical agents and flexibility (especially advantageous at low temperature), a hardner such as wax, hard asphalt or resin is used to control the texture such as by making a non-tacky product, etc., and a plasticizer such as a viscous mineral oil or a petrolatum, soft asphalts, etc., may be used for adhesiveness and as a relatively cheap bodying agent. (The amounts indicated are by weight):

| Material | General Limits | Preferred Limits |
|---|---|---|
| | Per cent | Per cent |
| Rubber (or equivalent) | 30 to 90 | 50 to 75 |
| Saturated polymer | 5 to 60 | 20 to 50 |
| Hardener (e. g., wax, hard asphalt or resin) | 0 to 30 | 2 to 20 |
| Plasticizer (e. g., viscous mineral oil, etc.) | 0 to 20 | 1 to 10 |

The following table gives some examples of compositions to be used:

| Example | 1 | 2 | 3 | 4 | 5 |
|---|---|---|---|---|---|
| | Per cent by weight | Per cent by weight | Per cent by weight | Per cent by weight | Percent by weight |
| Rubber | 70 | 60 | 50 | 60 | 50 |
| Polymerized isobutylene (15,000 m. wt.) | 30 | | | | |
| Polymerized isobutylene (80,000 m. wt.) | | 40 | | 35 | 25 |
| Polymerized isobutylene (150,000 m. wt.) | | | 50 | | 10 |
| Carbon black | | | | | 5 |
| Inorganic filler (e. g., ZnO, etc.) | | | | | 5 |
| Hardener (resin or high melting point wax) | | | | 5 | 5 |
| Plasticizer | | | | | 5 |

Modified rubber compositions in which the modifying agent is a high molecular weight substantially saturated aliphatic hydrocarbon polymer such as polyisobutylene, are particularly useful and have many advantages when made according to the present invention. For example a composition prepared by dissolving 1% to 10% by weight of a polyisobutylene having a molecular weight of at least 2,000, in gasoline, and swelling rubber (preferably about 4 to 10% by weight) in the resultant solution is in itself useful as a "rubber cement" adhesive because the high molecular weight polymer makes the composition remain plastic even long after evaporation of the solvent and at the same time it helps to protect the thin layer of rubber from oxidation and other types of deterioration. Also, the rubber-isobutylene polymer composition left after the evaporation of the solvent is, as claimed in co-pending application 170,048, an excellent insulating material for electric wires, cables, etc., or for other types of electrical apparatus such as condensers, etc. Similar compositions prepared by the use of paraffin wax, petrolatum, heavy oils or mixtures thereof, instead of the isobutylene polymer, or in addition thereto, are also useful for electric insulation and they present certain advantages over prior compositions used for that purpose, inasmuch as they are homogeneous intracellular dispersions of the high molecular weight hydrocarbons within the colloidal rubber particles and hence possess higher dielectric capacity, and more uniform other electric properties and better stability.

When the viscous polymer-rubber-gasoline composition just referred to is allowed to evaporate, the residual, dry, rubber-polymer composition is found to be a homogeneous mixture of the high molecular weight saturated hydrocarbon polymer intimately and uniformly or homogeneously dispersed within the colloidal particles or cells of the rubber. The true homogeneity of this composition is a distinct advantage over similar compositions prepared by mere mechanical mixing and also over compositions prepared by separately dissolving or swelling each of the constituents in a volatile solvent, mixing the two solutions and evaporating the mixture, because the present process provides greater tensile strength and resistance to oxidation, hardening and cracking with age.

In the above-described preferred method, the colloidal cell walls of the rubber tend to prevent any migration or cold flowing of the saturated polymer and, in fact, the polymer and the rubber appear to mutually protect each other because the polymer being so truly uniformly and intimately dispersed within the rubber colloid particles serves to protect the latter from oxidation and deteriorating effects of moisture, oxidation, ozone, or other chemical influences.

Polymer-rubber compositions prepared according to this invention, such as by the method just described, present a number of properties which are particularly useful and advantageous in the construction of insulated electric conductors. They are superior to either constituent when used alone for the rubber alone tends to oxidize and harden with age and is particularly susceptible to the deteriorating effects of ozone while, on the other hand, the saturated polymer alone cannot be vulcanized like rubber and does not in itself have sufficient mechanical strength, e. g. tensile strength, firmness, etc., to withstand the mechanical handling and the resistance to radial displacement by an electric cable conductor wrapped or extruded in it. Furthermore, the saturated polymer is relatively expensive compared to the rubber and also the polymers having a molecular weight substantially below 50,000 have a relatively high tendency toward cold flowing. The rubber-polymer insulation, however, possesses both suitable mechanical strength because the rubber can be vulcanized and has extremely high dielectric strength and high insulation resistance as well as low specific inductive capacity and power factor due to the intimate and homogeneous presence of the saturated polymer. The rubber when compounded by swelling in a volatile solvent solution of the polymer, greatly reduces or totally prevents cold flow and consequently prevents radial displacement of the one or more electric conductors in a cable. The composition is also superior to compositions of oil and rubber because its consistency is less affected by changes in temperature.

As has been pointed out in the parent copending applications, one of the primary advantages of the modified rubber compositions of this invention is that they can be used in contact with fibrous materials such as cloth, paper, wood, etc., as when being used as an adhesive for such materials, without having appreciable penetration of the adhesive fluid into the fibers. This is particularly true of the solvent-free compositions, but also applies to the "wet" compositions still containing the volatile solvent, provided that an excess of volatile solvent has not been used over the amount required to actually swell the rubber, and providing excessive heating was not used during the swelling, or excessive agitation or any other type of mechanical force which would tend to break down the colloidal cellular structure of the rubber. The use of these non-penetrating compositions is of advantage in preparing laminated products where, for example, the side of the paper opposite from that to which a metal foil is attached, is to be coated with a material which will not adhere to a waterproof paper; a typical example of such a product which is thus made possible, is a gummed paperfoil tape used for fastening envelopes and packages. In other words, the compositions of this invention may be used to waterproof one side of a thin paper or cloth without waterproofing the other side, thus permitting this other side to be written on or printed with aqueous inks, etc., or coated with aqueous paste, glue or other aqueous coating compositions.

Modified rubber compositions prepared according to this invention have been found applicable to a wide variety of uses such as waterproofing of cloth in making flexible automobile tops, raincoats, tents, awnings, etc., and in waterproofing various other materials such as paper, wood, masonry, leather, etc. They have also been found useful for preventing the corrosion of metals and for preventing the oxidation and deterioration of rubber goods such as automobile tires, rubber raincoats, etc., as well as for the electrical insulating purposes already referred to.

In considering the modifying agent to be used, it should be mentioned that if viscous hydrocarbon oils are used they should preferably boil essentially above about 600° F., and, where a substantially colorless modified rubber composition is desired, it is preferred to use viscous white oils such as several of those which are on the market which have viscosities in the vicinity of 300 seconds Saybolt at 100° F. and higher. Petrolatum has been mentioned as a modifying agent and it should be understood to include the many varied products which are available such as petrolatums having melting points of 120°, 130°, 140° up to 180° F. or even higher; these so-called non-crystalline petroleum waxes may be either the highly refined and substantially colorless type or the crude products which have a green or brownish color, or products of intermediate stage of refinement.

As to the volatile hydrocarbon solvents such as the naphthas, the boiling ranges of some of the commonly available products are listed herewith for general information:

| Common Name | Boiling Range, °F. |
|---|---|
| Petroleum ether | 100–150 |
| "56" naphtha | 140–210 |
| "54" naphtha | 165–235 |
| V. M. & P naphtha | 215–310 |
| Gasoline | About 100–400 |
| Varnolene | About 300–400 |

The particular volatile solvent to be used will be selected chiefly according to how fast it is desired to have the solvent evaporate from the modified rubber composition. Generally the lower boiling solvents have a greater solvent action on paraffin wax.

Having thus described the materials and procedure to be used in preparing the compositions to be used in this invention, the methods will now be discussed for forming free continuous coherent sheets from those compositions. If desired, the "wet" or solvent-containing composition may be spread onto a smooth polished surface, e. g. metal or glass, etc., in a film of suitable thickness, e. g. about 1/100 to 1/2 inch, or preferably about 1/64 to 1/8 inch (about 1/2 to 2 or 3 mms.) either in the form of large sheets or as a continuous band, from which the solvent is then evaporated and then the residual "dry" or solvent-free modified rubber composition is then scraped or pulled off from the polished surface as a free continuous coherent sheet or film. This self-sustaining sheet or film can then either be wound or coiled up on a drum as a roll or it may be cut into pieces of the desired length and width or piled and compressed together to make thick slabs. If these sheets are not going to be used immediately but are intended to be stored or shipped long distances, it may be desirable to interleaf them with a suitable sheet material such as paper, cloth, metal foil, etc., either plain or treated with some material such as glycerine, vegetable oil, etc., to prevent the sheets of modified rubber from adhering thereto.

Instead of spreading the "wet" composition on a smooth solid surface it may also be spread on a smooth liquid surface, providing it is one with which the modified rubber composition will not mix; for instance, water can be used or aqueous solutions of compounds intended to reduce the vapor pressure of the water, e. g. sugar, salt, starch, glycerine, etc., or liquid metal products such as mercury. The "wet" composition may be spread on the smooth surface by any suitable means such as by brush, spray, roll, immersing, etc. A knife edge or doctor blade may be used to obtain a layer of uniform desired thickness. The evaporation of the volatile solvent may be assisted and accelerated by various means such as heating the smooth surface on which the "wet" composition had been spread, by contacting the "wet" composition surface with warm air or other gases, which may be circulated if desired, or by reduced pressure (i. e. partial vacuum) or by a combination of these or other suitable means. If desired, the residual solvent-free modified rubber sheet may be subjected to a light rolling, with or without the application of a slight amount of heat, in order to give it a smooth surface on both sides and to insure its being of the desired uniform thickness. For this finished rolling, the rolls (or at least the one which will contact the surface of the modified rubber sheet from which the solvent evaporated) should be warm enough to make the film soft and pliable but not hot enough to cause excessive softening; usually the temperature should be between room temperature and about 30 or 50° C. The finished thickness of the modified rubber sheet should be about 1/1000 to 1/8 of an inch, preferably about 1/100 to 1/16 of an inch.

The formation of these free continuous coherent sheets of modified rubber is preferably carried out continuously by feeding the "wet" composition continuously onto a rotating disc or endless belt conveyor either consisting of or coated with a smooth thin sheet or film of polished metal or glass-coated metal, then passing the loaded portion of the conveyor through a vacuum and/or heat dryer to remove the volatile solvent, and finally continuously scraping off the solvent-free film or stripping it loose from the surface on which it had dried. A sudden cooling or chilling usually makes it easier to strip the film loose from the metal surface. Also, if desired, the smooth or polished metal or glass surface on which the "wet" composition is spread for drying may be previously rubbed with a cloth impregnated or saturated with a liquid or solution, e. g. glycol or glycerine, etc., to reduce the tendency of the modified rubber composition to adhere to the solid surface. The evaporation of the solvent should be carried out in such a way as to permit condensation of the solvent vapors for reuse.

A few alternative ways of forming the free continuous coherent sheets of modified rubber will be discussed briefly. Instead of spreading the "wet" composition in a single layer which is thick enough to make a solvent-free film of the desired finished thickness, a plurality of thin layers may be evaporated one on top of the other, after the preceding one had been dried either partially or completely, depending upon the nature of the solvent, modifying agent and rubber-like material being used. Another way to assist in removing the dry film from a polished metal surface, is give the metal surface a preliminary moistening with molten wax, preferably having the metal surface, e. g. a continuous belt conveyor made of thin sheet metal, or leather, rubber, fabric, etc. coated with a polished metal foil, at a temperature of a few degrees above the melting point of wax, then cooling it down below the solidifying temperature before applying the "wet" modified rubber composition, and finally after evaporation of the solvent, warming the polished metal surface to slightly above the melting point of the wax. Although such procedure may impart to the surface of the modified rubber sheet a very slight trace of paraffin wax, which may not be enough to be objectionable for many purposes, if desirable, this slight trace can be removed either by a mechanical brushing or scraping or by a quick short-time contact or washing with a solvent for the paraffin wax such as naphtha; if the latter means is used, it should be done with a low boiling solvent which will evaporate very quickly and will not unduly soften the sheet of modified rubber.

Another method of making the desired coherent sheets of modified rubber is to dip a rigid straight edge surface of suitable material such as wood or metal, into a tank containing a large volume of the "wet" or solvent-containing modified rubber composition, and then slowly raise that solid edge to which the modified rubber composition will adhere by capillary action, and then continue the raising very slowly and at the same time evaporating the solvent from both surfaces thereof, preferably by warm air or vacuum drying. Then as fast as the film becomes dry it may be rolled up on a suitable roll. Usually the dry film will be strong enough to support the weight of the "wet" film which is being drawn up from the tank. If desired, this process may somewhat be reversed by letting the "wet" composition run out through a horizontal slot in the bottom of the tank, just slow enough that the "wet" film will dry itself on the way down and can then be rolled up on a suitable roller. Either of the last two methods has an advantage over the spreading of the "wet" composition on a smooth metal surface, in that the volatile solvent evaporates simultaneously from both sides of the film whereas when it is on a metal surface it can only evaporate from one side; on the other hand both of the free vertical film methods require careful adjustment and in some cases are not as convenient and practical as the use of a belt-conveyor.

Although when producing the free coherent sheets of modified rubber, it is preferred, as disclosed above to actually form the film with a thickness which is exactly or very nearly that which is desired for the final product, other methods may be used under some circumstances. For instance, if the "wet" composition is spread out and evaporated in very thin films, as, for instance, making a dry film having a thickness of about $1/100$ of an inch, and yet it is desired to have a finished coherent sheet having a thickness of, for instance, $1/16$ of an inch, the thin film may be rolled or otherwise massed together and then kneaded or put through rollers, preferably at a sufficiently elevated temperature to make the mass soft and pliable, just sufficiently to permit rolling the product out into a sheet of the desired thickness. If desired, two or more or even as many as five or 10 layers of very thin film such as $1/100$ of an inch thick may be superimposed upon one another and then pressed or rolled together with sufficient heat and pressure to cause a complete bonding of the thin films into one coherent sheet of the desired thickness.

In the appended claims, the term "unmilled" rubber or rubber-like material is intended to mean that the material has not been subjected to any more milling or mastication than the slight amount which it may have undergone at the rubber plantation for instance, or the slight amount which may be necessary to merely alter the thickness of the finished solvent-free modified rubber composition; in any case, it means that the product has not been subjected to any milling necessary to make the modified rubber composition per se homogeneous.

The uses for which the free continuous coherent sheets of modified rubber of this invention are adapted are very numerous. For instance, they may be used for wrapping foods as well as many industrial products to prevent them from drying out or from absorbing moisture; they may be used in the form of plain sheets or they may be cut into circular discs, the edge of which is gathered into folds and sewed on to an elastic tape band so as to form a dish cover which will fit snugly around the edge of a dish. In the form of flat sheets cut to various suitable dimensions such as 3 inches by 5 inches, or 8½ inches by 11 inches, or 2 feet by 2 feet, etc., they may be used as a thermoplastic or heat-sealing adhesive, for instance, for mounting pictures on cardboard backing, or for bonding two or more layers of sheet material into laminated products, for instance, bonding two layers of cloth together to make a waterproof and in fact also gasproof and moistureproof cloth fabric suitable for use as a flexible automobile top or for raincoats, tarpaulins, etc., or for bonding two sheets of paper together or one sheet of paper and one sheet of cloth or for bonding two thin sheets of wood, such as used in making plywood. These modified rubber sheets, especially in the vulcanized condition, may also be used for electrical insulation purposes, for example, by the conventional spiral wrapping method or strip covering, etc., and also for making rubber balloons, rubber gloves, etc.

In making laminated cloth fabrics, various types of cloth may be used, i. e. cotton, linen, wool, silk, etc., as various textiles and also other types of cloth such as asbestos cloth or combinations thereof, such as one sheet of asbestos and one of textile cloth. Leather is another fibrous sheet material which is adapted for making laminated products according to the present invention. A convenient method of bonding these sheets together to make a laminated product is to feed the two sheets of cloth from rolls thereof simultaneously along with a sheet of unvulcanized or vulcanized modified rubber from a roll thereof, having the modified rubber adhesive between the two sheets of cloth and feeding them through a pair of rolls, preferably heated sufficiently to make the modified rubber composition soft enough to bind it to the fibers of the cloth, using sufficient pressure on the rolls to bond the two sheets of cloth with intermediate modified rubber adhesive layer into one unified laminated product. It is preferred to use a sheet of unvulcanized modified rubber in the laminating step, and then vulcanize after the lamination.

In this phase of the invention a thin metal foil such as aluminum foil or tin foil, etc., may be used as one element of the laminated product, to be bonded to a sheet of cloth or paper or other fibrous material by means of a continuous coherent sheet of modified rubber composition. In fact, if desired, two or more sheets of aluminum foil may actually be bonded directly together with this sheet of modified rubber. The discovery that the continuous coherent solvent-free sheets of modified rubber composition made according to this invention are satisfactory for making laminated sheet of which a metal foil constitutes one element is quite unexpected because it was thought that the preservation of the colloidal cellular structure of the rubber in these compositions would prevent the solvent-free sheets from adhering satisfactorily to a polished metal foil.

Another modification of this invention is the preparation of laminated sheet materials consisting of only fibrous sheet materials, bonded together by modified rubber compositions prepared according to the method disclosed hereinbefore but applied in the "wet" or solvent-containing condition to the surfaces of the fibrous sheet material to be joined together. There are several methods of accomplishing this result. For example, if two sheets of cloth are to be laminated together a jelly-like mass of modified rubber, prepared as described above and containing, for instance, paraffin, rubber and naphtha, is applied to one side of one of the sheets of cloth by any suitable means, such as brush, spray, roll, immersion, etc., advantageously using a doctor blade to insure having a layer of uniform thickness, and then feeding the other sheet of cloth onto the adhesive coated surface of the first sheet, using only a light rolling to prevent entrainment of air between the adhesive and the upper layer of cloth, and not using enough pressure to squeeze out any substantial amount of the adhesive from the edges of the sheets of cloth, and finally, evaporating the volatile solvent from the resultant product. If desired, after drying, the laminated product may be passed through heated rolls with a sufficient amount of pressure to insure a tight bond uniformly throughout the entire laminated product.

Another alternative method of making these laminated products is to apply the modified rubber adhesive, while still containing the solvent, to one side of one sheet of cloth, allowing a major proportion of the volatile solvent to evaporate and then, just before the adhesive coating becomes totally dry or solvent-free, the second sheet of cloth is rolled onto the adhesive coated surface of the first sheet, using pressure on the rolls and, if desired, some heat in the rolls to insure sufficient plasticity and adhesiveness for strong uniform bond. A further alternative is to apply a thin layer of modified rubber adhesive, still containing the solvent, to one side of both sheets of cloth, permitting each sheet to dry almost to completion, and then when the surface of the adhesive is still just slightly tacky, roll the two adhesive coated surfaces together with pressure and a slight amount of heat. In any case, after the final bonding together, the product may be passed through a vacuum drying zone to remove the last trace of volatile solvent, and if desirable, then pass the solvent-free laminated product over cold or chilled rolls to reduce the inherent tendency of any modifying agents, such as paraffin wax, petrolatum, viscous oils, gums, resins, etc. which are in a soft plastic condition to dissolve the rubber or partially disintegrate the colloidal cellular structure thereof.

Further details and advantages of the invention will be apparent to those skilled in the art by a consideration of the following specific examples and the accompanying drawing, in which.

Example 1

Figure 1:
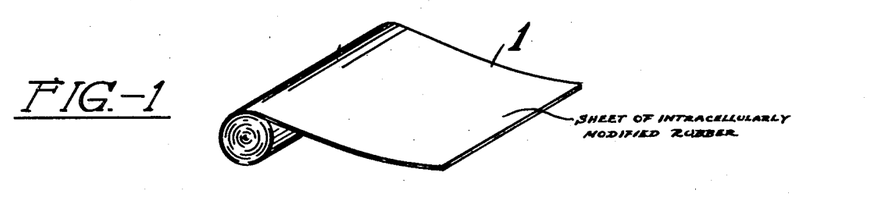
Fig. 1 represents in perspective a partially unwound roll of intracellularly modified rubber in sheet form.
Figure 2:
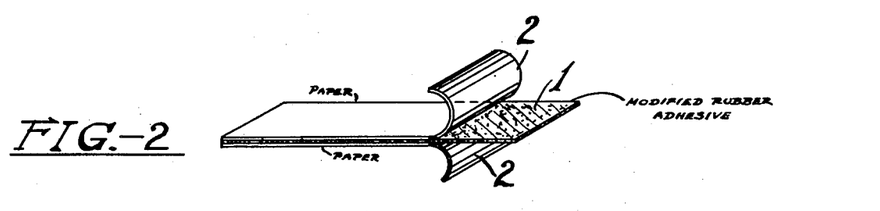
Figs. 2 to 5 are sections through various laminated products, cut through perpendicularly to the plain of the laminated sheet material, the edges of the sheet material being shown turned back so as to reveal the construction of the product and to show more clearly the location of the adhesive, Fig. 2 representing two sheets of paper bonded together with a continuous coherent sheet of modified rubber adhesive, Fig. 3 being two sheets of paper bonded with modified rubber adhesive but not necessarily in the form of a continuous coherent sheet, Fig. 4 representing one sheet of paper and one sheet of cloth bonded with a continuous coherent sheet of adhesive, and Fig. 5 showing two sheets of cloth bonded with modified rubber adhesive but not necessarily in the form of a continuous sheet. In these various figures like parts are represented by like numerals, 1 representing a continuous coherent sheet of modified rubber, 1A representing modified rubber adhesive but not necessarily in the form of a continuous coherent sheet, the numeral 2 indicating paper and 3 indicating cloth.
Figure 3:
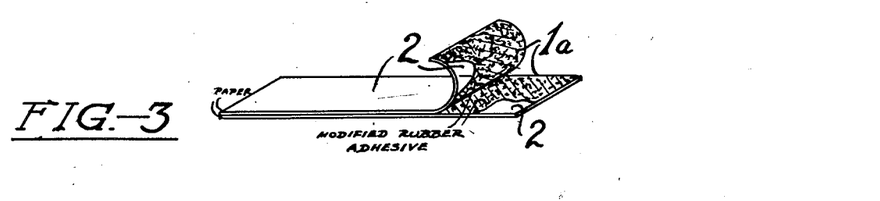
Figure 4:
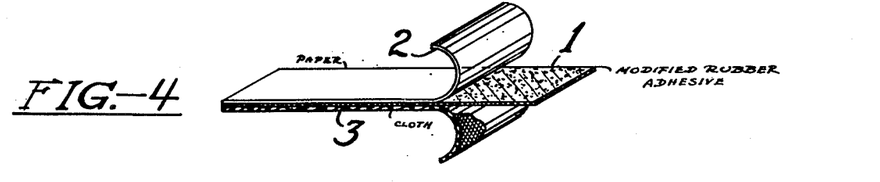
Figure 5:
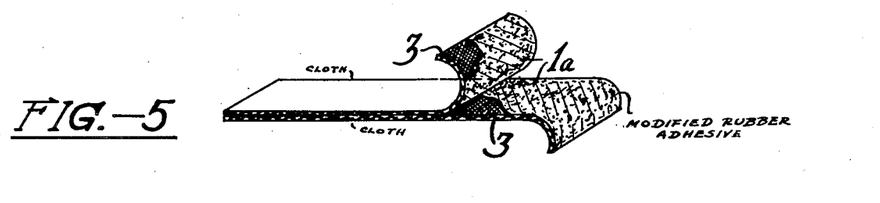

The composition described in the beginning of this application made by dissolving paraffin wax in gasoline and swelling rubber in the resultant solution, was spread in a thin film and evaporated to dryness. The residual continuous coherent sheet of wax-rubber composition contained about 55% by weight of paraffin wax homogeneously and intracellularly dispersed within about 45% by weight of rubber having a colloidal cellular structure.

Example 2

About 5% by weight of polyisobutylene having a molecular weight of about 10,000 was dissolved in about 90% by weight of a gasoline having a boiling range from about 100 to 400° F., and about 5% by weight of pale crepe rubber, cut into small pieces, was swelled in the resultant solution over night at room temperature. A small amount of unabsorbed solution was decanted, and the remaining jelly-like mass was stirred slightly to insure having a uniform spreadable consistency, then it was spread out in a layer of about $\frac{1}{16}$ of an inch thick on a glass plate and allowed to dry. The solvent-free product was estimated to contain about 45% by weight of polyisobutylene and about 55% by weight of rubber. The thin film of polymer-rubber composition, could after being loosened at the edges, be stripped off from the glass plate without much difficulty due to the greater toughness and tensile strength of the composition and this film was found to remain plastic and elastic for many months, whereas a similar film of plain rubber showed relatively rapid tendencies to become hard and brittle, presumably due to oxidation.

Example 3

40 parts by weight of paraffin wax having a melting point of about 122° F. were dissolved in 312 parts by weight of a naphtha having a boiling range of 165–235° F. using a slight amount of heat to accelerate solution of the wax, and 15 parts by weight of pale crepe rubber cut into small thin pieces about $\frac{1}{4}$ of an inch square and about $\frac{1}{16}$ of an inch thick were swelled in the resultant solution over night at a room temperature of about 75° F. The resultant jelly-like mass was stirred lightly, spread out in a thin layer on a piece of paper, allowed to evaporate and then another sheet of paper was placed on the adhesive surface of the solvent-free wax-rubber composition, and pressed down using a heated iron surface to soften the wax-rubber composition. The two sheets of paper were found to be satisfactorily bonded together to make a pliable waterproof laminated paper product in which the bonding layer contained about 77% of paraffin wax and about 23% of rubber.

Example 4

Some gasoline was saturated with paraffin wax at a temperature of about 68° F. and one volume of each of four different kinds of rubber, namely clean thin brown crepe, No. 1 ribbed smoked sheet, Up River fine Para, and first latex pale crepe, was swelled in a glass jar containing about 50 volumes of paraffin-saturated gasoline. The rates and degree of swelling of the different rubbers were very slightly different but in each case when the solvent was permitted to evaporate from the wax-impregnated rubber, the residual mass was strong and tough and formed a continuous coherent sheet.

Example 5

10 parts by weight of paraffin wax were dissolved in 82 parts by weight of gasoline, and 8 parts by weight of pale crepe rubber cut into thin small pieces were swelled in the resultant solution at room temperature overnight. The resultant jelly-like mass was very viscous at room temperature and was spreadable, although, if warmed up slightly it could be spread much easier. Part of the mass was diluted with gasoline to make a composition containing about 5 parts by weight of paraffin, 4 parts of rubber and 91 parts of gasoline. Some of each of these compositions were then used as the bonding layer between two sheets of paper and made a satisfactory laminated product in each case. A number of different compositions were prepared by dissolving various amounts of 122° F. melting point wax in a naphtha having a boiling range of about 165 to 235° F., and swelling pale crepe rubber in the resultant solution, using various percentages ranging from 6 to 10% of paraffin wax, from 5 to 8% of rubber and from 82 to 89% of naphtha, and a composition having 10% by weight of paraffin, 7% by weight of rubber and 83% of naphtha was considered to have the best combination of properties including good spreading consistency and the production of a tough continuous coherent film of wax-rubber composition having exceptionally good waterproofing properties.

Example 7

450 parts by weight of paraffin wax were dissolved in 3,000 parts by weight of naphtha, and 300 parts by weight of pale crepe rubber were swelled in the resultant solution thus making a combination containing 12% by weight of paraffin, 8% of rubber and 80% of naphtha. This jelly-like mass was spread in a thin film on large glass sheets from which, after the solvent had evaporated, the residual wax-rubber film was stripped off, using a sharp steel edge to assist in removing the modified rubber film from the glass as a flexible, fairly elastic, waterproof, self-supporting film.

Example 8

50 grams of paraffin wax having a melting point of 122° F. was dissolved in 410 grams of a varnolene (heavy naphtha) having a boiling range from about 300–400° F. and the resultant solution was brought to a temperature of 55° C. (about 130° F.) in constant temperature bath, then 40 grams of pale crepe rubber $\frac{1}{16}$ inch thick cut into ½ inch square were immersed in the wax-naphtha solution. The mixture was allowed to stand at 55° C. for 2½ hours at which time the rubber appeared completely swelled and the mass homogeneous. The resulting composition was found to be a very satisfactory bonding agent for laminating two pieces of paper together without having any of the adhesive composition penetrate through the paper to the side opposite from that to which the adhesive had been applied.

This composition has a very high viscosity, and when spread out in a layer on a glass plate and evaporated, a residual wax-impregnated rubber film having a thickness of almost $\frac{1}{16}$ of an inch could be stripped off from the glass plate in the form of a free coherent continuous film which was exceedingly flexible even at quite low temperatures, was waterproof, gasproof, moisture proof and had the peculiar property that, in spite of the high content of paraffin wax, it had a very unexpectedly high tensile strength and elongation. It could be stretched into exceedingly thin film having a thickness of substantially less than 1/1000 of an inch and so thin that it was very clear and transparent and yet exceedingly tough even when stretched to such a thin film. Furthermore when the tension of this film was released it showed very substantial elastic tendencies to recover its original shape.

Example 9

Example 8 was repeated except that the swelling of the rubber in the wax-naphtha solution was carried out at 100° C. (212° F.) for two hours. The resultant product had substantially identical properties with those made in Example 8.

Example 10

176 parts by weight of paraffin wax having a melting point of 122° F. were dissolved in 100 parts by weight of varnolene at 55° C., and 24 parts by weight of pale crepe rubber cut into pieces as in Example 8 were allowed to swell in the paraffin-naphtha solution at 55° C. overnight (about 15 hours), although it was not considered necessary to use such a long swelling time. Some of the resultant product, after evaporation of the solvent, in the form of a thin continuous coherent sheet, was found to be surprisingly tough and resistant to breaking by stretching, considering that it contained about 88% of paraffin wax and only 12% of rubber. This same composition proved to be a very satisfactory thermoplastic adhesive for bonding two sheets of paper together, and this also without any penetration through the paper.

Example 11

10 parts by weight of a medium penetration petroleum asphalt were dissolved in about 82 parts by weight of varnolene at about 130° F. and about 8 parts by weight of pale crepe rubber cut into thin small pieces were swelled in the resultant solution. The product was a black jelly-like mass which, when spread on a smooth glass sheet, evaporated to a fairly tough and slightly tacky but continuous coherent sheet of asphalt-rubber composition. The toughness and elasticity of the product indicated that the rubber still retained substantially all of its original colloidal cellular structure and that the asphalt was essentially all intracellularly dispersed within the rubber.

Example 12

A 10% by weight solution of polyisobutylene having an average molecular weight of about 15,000, in a "54" naphtha (having a boiling range of 165 to 235° F.) was made, and pale crepe rubber cut into pieces as in Example 8 was swelled in that solution in proportions to make a composition containing 9.3% by weight of polyisobutylene, 8.0% by weight of rubber and 82.3% by weight of naphtha. This composition made an excellent non-penetrating adhesive for laminating two sheets of paper together, and this composition also, when spread in a thin film and evaporated, produced continuous coherent sheets of polyisobutylene-rubber which were very tough and elastic, slightly tacky on the surface and exceedingly flexible even at low temperatures as 0° F. Films of this polyisobutylene-rubber composition have apparently great resistance to oxidation and chemical action inasmuch as they show practically no tendency to harden with age.

Example 13

Some of the solvent-containing modified rubber composition made in Example 7 (containing 12% by weight of paraffin wax, 8% by weight of rubber and 80% of naphtha) was spread in a layer about ¼ inch thick on the surface of water in a container, and a mild current of warm air was passed over the surface of this modified rubber composition until the volatile solvent was completely evaporated. The residual paraffin-rubber composition was left on the surface of the water in the form of a free continuous coherent sheet which could readily be lifted off the water.

Example 14

A sheet of wax-rubber composition was made as in Example 10, i. e. containing 88% of paraffin wax and 12% of rubber. This sheet was tested for tensile strength and elongation at two different temperatures, with the following results:

|  | Lbs./sq. in. | Per cent Elongation |
|---|---|---|
| 85° F | 297 | 400 |
| 95° F | 71 | 1,200 |

The tensile strength of 297 pounds per square inch at 85° F. is surprisingly high considering that paraffin wax alone has a tensile strength of only about 100 pounds per square inch and natural rubber alone, uncured, has a tensile strength in the vicinity of about 1,000 pounds per square inch. Therefore, a composition containing 12% of rubber and 88% of wax would be expected to have a tensile strength of about 200 pounds per square inch as calculated to be the proportionate average of the tensile strength values of the separate constituents. In this connection it is important to note that compositions made of similar proportions of wax and rubber but made by dissolving and milling the rubber into molten wax generally have a tensile strength far below 200 pounds per square inch instead of substantially above that figure as obtained according to the present invention.

Likewise, the 400% elongation obtained in the above test is far superior to the proportionate average of the values of the separate constituents, because at 85° F. paraffin wax alone has an elongation of practically 0%, while uncured rubber alone has an elongation of about 700%, the proportionate average for a mixture containing 12% of rubber and 88% of wax being therefore about 90% elongation. Several compositions made by mixing and dissolving 12% of rubber into 88% of molten wax had values in the range of about 10 to 25% elongation at 85° F.

Compositions made by the process of the present invention and containing even higher amounts of rubber such as 45% of rubber with 55% of wax, also possess tensile strength and elongation substantially greater than the proportionate average of the values of the several separate constituents. It is difficult if not impossible to make compositions having such a high proportion of rubber by the process of dissolving and kneading the rubber into molten paraffin wax, without causing such a tremendous breakdown of the colloidal structure of the rubber that the finished product has a tensile strength far inferior to that produced by the process of the present invention.

The invention should not be limited by any of the specific examples given nor unnecessarily by any theory as to the mechanism of the operation of the invention but only by the appended claims in which it is intended to claim all novelty inherent in the invention.

I claim:

1. A composition comprising essentially rubber, a petroleum hydrocarbon wax, and a polyisobutylene having an average molecular weight of at least about 2,000.

2. A free continuous coherent sheet composed of a solvent-free composition comprising essentially rubber having a colloidal cellular structure, and homogeneously and intracellularly dispersed therein a hydrocarbon wax and a polyisobutylene having an average molecular weight of at least 2,000.

WILLIAM H. SMYERS.

REFERENCES CITED

The following references are of record in the file of this patent:

UNITED STATES PATENTS

| Number | Name | Date |
|---|---|---|
| 2,054,114 | Abrams et al. | Sept. 15, 1936 |
| 2,054,115 | Abrams et al. | Sept. 15, 1936 |
| 2,054,116 | Abrams et al. | Sept. 15, 1936 |
| 2,280,860 | Smyers | Apr. 28, 1942 |